(12) United States Patent
Reimann et al.

(10) Patent No.: US 8,088,862 B2
(45) Date of Patent: Jan. 3, 2012

(54) STABLE DISPERSIONS OF INORGANIC NANOPARTICLES

(75) Inventors: Jorg Reimann, Wesel (DE); Carsten Nagel, Dulmen (DE); Janin Tecklenburg, Oberhausen (DE)

(73) Assignee: BYK-Chemie GmbH, Wesel (DE)

( * ) Notice: Subject to any disclaimer, the term of this patent is extended or adjusted under 35 U.S.C. 154(b) by 275 days.

(21) Appl. No.: 12/426,399

(22) Filed: Apr. 20, 2009

(65) Prior Publication Data

US 2009/0270553 A1 Oct. 29, 2009

(30) Foreign Application Priority Data

Apr. 23, 2008 (DE) .................... 20 2008 005 669 U
Jun. 6, 2008 (DE) .................... 20 2008 007 626 U
Jun. 25, 2008 (DE) .................... 10 2008 029 858

(51) Int. Cl.
C08K 5/21 (2006.01)
C08G 18/02 (2006.01)
C08G 18/38 (2006.01)

(52) U.S. Cl. ......... 524/590; 524/211; 524/589; 524/728
(58) Field of Classification Search .................. 524/211, 524/589, 590, 728
See application file for complete search history.

(56) References Cited

U.S. PATENT DOCUMENTS

| 4,079,028 A | 3/1978 | Emmons et al. ............. 260/29.6 |
|---|---|---|
| 5,868,826 A * | 2/1999 | Fischer et al. ................ 106/237 |
| 6,420,466 B1 * | 7/2002 | Haubennestel et al. ...... 524/195 |
| 6,503,960 B1 * | 1/2003 | Kadziela et al. ................ 522/78 |
| 6,617,468 B2 * | 9/2003 | Haubennestel et al. ......... 560/25 |
| 6,797,771 B2 * | 9/2004 | Sapper et al. .................. 524/728 |
| 6,870,024 B2 * | 3/2005 | Haubennestel et al. ........ 528/49 |
| 7,641,972 B2 * | 1/2010 | Nolte et al. .................... 428/403 |
| 7,652,166 B2 * | 1/2010 | Haubennestel et al. ........ 560/25 |
| 7,851,544 B2 * | 12/2010 | Gobelt et al. ................. 524/555 |
| 2004/0055093 A1 * | 3/2004 | Offord et al. ................. 8/115.66 |
| 2006/0204528 A1 * | 9/2006 | Nolte et al. .................... 424/401 |
| 2009/0270553 A1 * | 10/2009 | Reimann et al. .............. 524/590 |
| 2010/0322879 A1 * | 12/2010 | Gobelt et al. ................... 424/59 |

FOREIGN PATENT DOCUMENTS

| CA | 2 658 447 | | 2/2008 |
| DE | 100 39 837 A1 | | 3/2002 |
| DE | 10 2005 006 870 A1 | | 8/2006 |
| DE | 10 2007 030 285 A1 | | 2/2008 |
| EP | 1 690 902 A2 | | 8/2006 |
| WO | WO 2006/079098 | * | 7/2006 |
| WO | WO 2008/173654 A2 | | 2/2008 |

OTHER PUBLICATIONS

Results from STIC structure search for the compound of General Formula I and General Formula II/II'. Obtained Nov. 2, 2011.*

* cited by examiner

Primary Examiner — Mark Eashoo
Assistant Examiner — Michael Salvitti
(74) Attorney, Agent, or Firm — Woodard, Emhardt, Moriarty, McNett & Henry LLP

(57) ABSTRACT

The invention relates to stable dispersions of inorganic nanoparticles, comprising inorganic nanoparticles in a dispersion medium, the dispersions being admixed with at least one stabilizer from the group of (i) modified, more particularly hydrophobically modified, preferably urea-modified polyurethanes and (ii) modified ureas, more particularly urea urethanes, and also mixtures and/or combinations thereof, and also to the use of these dispersions.

5 Claims, No Drawings

STABLE DISPERSIONS OF INORGANIC NANOPARTICLES

CROSS REFERENCES TO RELATED APPLICATIONS

This application claims priority to German Patent Application Nos. DE 20 2008 005 669.1, filed Apr. 23, 2008; DE 20 2008 007 626.9, filed Jun. 6, 2008; and DE 10 2008 029 858.1, filed Jun. 25, 2008, all of which are expressly incorporated by reference herein, in their entirety.

BACKGROUND OF THE INVENTION

The present invention relates to the field of dispersions of inorganic nanoparticles.

The present invention relates more particularly to stable dispersions of inorganic nanoparticles and also to their use and preparation and, furthermore, to systems comprising these dispersions. The present invention further relates to a method of stabilizing dispersions of inorganic nanoparticles.

For the purpose of improving the mechanical properties of coating and dispersion systems (as, for example, of paints, inks such as printing inks, coatings, etc.) and of plastics, more particularly for the specific purpose of enhancing their wear properties, such as scratch resistance or the like, the incorporation of additives and fillers is part of the core knowledge of the skilled person. Increasingly here dispersions of inorganic nanoparticles are being employed. Some of these nanoparticles (examples being $TiO_2$ and/or $ZnO$) are also used in order to improve the UV stability.

One problem frequently associated with conventional dispersions of inorganic nanoparticles is the inadequate storage stability, and more particularly the tendency towards sedimentation. This phenomenon may ultimately result in the sedimented nanoparticles undergoing agglomeration or caking with one another after prolonged periods of storage, and forming a solid residue which can no longer be stirred up and/or broken down, with the consequence that, eventually, the dispersions can no longer be used at all. The sedimentation tendency is promoted by the high densities of the inorganic nanoparticles. Inorganic nanoparticles having particularly high densities, in the range from 5 $g/cm^3$ to 6 $g/cm^3$ or even more, such as inorganic particles based on zinc oxide, antimony/tin oxides (ATO), indium/tin oxides (ITO) or the like, for example, display a particularly strongly pronounced tendency to form sediment.

Consequently attempts have also been made in the prior art to make such dispersions of inorganic nanoparticles storable or sedimentation-stable through addition of specific additives, more particularly stabilizers. A critical disadvantage of the stabilizers or additives used in the prior art, however, is that their incorporation typically entails a disadvantageous adverse effect on the flow capacity properties or the Theological properties of the dispersions. Frequently, indeed, there is an unwanted solidification of the dispersions stabilized in this way. Occasionally, however, a syneresis is observed, in tandem with unwanted phase separation as a result of the sedimentation. Systems of this kind are then no longer suitable for the aforementioned applications.

BRIEF SUMMARY

The invention relates to stable dispersions of inorganic nanoparticles, comprising inorganic nanoparticles in a dispersion medium, the dispersions being admixed with at least one stabilizer from the group of (i) modified, more particularly hydrophobically modified, preferably urea-modified polyurethanes and (ii) modified ureas, more particularly urea urethanes, and also mixtures and/or combinations thereof, and also to the use of these dispersions.

It is an object of the present invention, therefore, to provide disperse systems of the aforementioned kind, more particularly dispersions of inorganic nanoparticles, which are suitable more particularly for use in the aforementioned systems and which avoid or else at least attenuate the above-described disadvantages of the prior art.

It is an object of the present invention more particularly to provide stable or stabilized disperse systems of the aforementioned kind, more particularly dispersions of inorganic nanoparticles, which are storage-stable or sedimentation-stable even over prolonged periods of time, but where the flow capacity properties or the Theological properties of the resulting stabilized dispersions are to continue readily to allow use for the aforementioned application purposes (e.g. in paints, inks, coatings, plastics, etc.).

To achieve the aforementioned object, the present invention, in accordance with a first aspect of the present invention, proposes a stable dispersion of inorganic nanoparticles according to the disclosure. Further, advantageous embodiments of this aspect of the invention are subject matter of the relevant dependent claims.

Further subject matter of the present invention, in accordance with a second aspect of the present invention, is the inventive use of the dispersion according to the present invention.

Still-further subject matter of the present invention, in accordance with a third aspect of the present invention, are inventive coating materials and coating systems, more particularly paints, inks and the like, plastics, foams, cosmetics, more particularly nail varnishes, adhesives and sealants which comprise the dispersion according to the present invention.

Further subject matter of the present invention, finally in accordance with a fourth aspect of the present invention, is a method of stabilizing a dispersion of inorganic nanoparticles.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

It will be readily appreciated that, in the text below, those embodiments and elucidations made only in relation to a single aspect of the present invention are also equally valid mutatis mutandis for the other aspects of the present invention, without any need for an express reference to this effect.

For all of the relative and/or percentage weight-related quantity data given below, it should be borne in mind that, in the context of the inventive dispersion, these are to be selected by the skilled person in such a way that in total, with incorporation of all of the ingredients, including adjuvants, further constituents or additives, dispersion media, etc., more particularly as defined below, they always add up to 100% by weight. This, however, is self-evident to a skilled person.

Furthermore, it is the case that, on an application-related or ad hoc basis, a skilled person may deviate from the quantity data given below, without departing from the confines of the present invention.

It should be noted, moreover, that all of the data below relating to the average molar mass or to the average molecular weight relate to what is called the weight-average molar mass or weight-average molecular weight, respectively.

The applicant has surprisingly discovered that the problem outlined above can be solved by adding to the relevant dispersions of inorganic nanoparticles at least one stabilizer based on a modified, more particularly hydrophobically modified, preferably urea-modified polyurethane or based on a modified urea, more particularly urea urethane, or mixtures and/or combinations hereof.

The present invention accordingly provides, in accordance with a first inventive aspect, a stable dispersion of inorganic nanoparticles, comprising inorganic nanoparticles in a dispersion medium, there being added to the dispersion at least one stabilizer from the group of
  (i) modified, more particularly hydrophobically modified, preferably urea-modified polyurethanes and
  (ii) modified ureas, more particularly urea urethanes,
and also mixtures thereof.

A particular feature of the present invention is therefore to be seen more particularly in the fact that, in accordance with the invention, a dispersion of inorganic nanoparticles is provided which is stabilized through the controlled addition of at least one stabilizer based on modified, more particularly hydrophobically modified, preferably urea-modified polyurethanes and/or modified ureas, more particularly urea urethanes, and hence is storage-stable. In this context the applicant, in a completely surprising way, has discovered that through the use of such stabilizers it is possible to provide an extremely storage-stable dispersion of inorganic nanoparticles which also—as will be set out comprehensively in the working examples that follow—shows no tendency, or no significant tendency, towards premature sedimentation of the nanoparticles and hence which can be readily used even after prolonged periods of storage.

A feature of the dispersion of the invention is that the stabilizers used do not adversely affect the Theological properties or the flow capacity or the viscosity of the dispersion of the invention in the context of its usefulness. In this connection, therefore, the composition of the invention, in addition to its outstanding storage stability or sedimentation stability, has outstanding application properties on the basis of its good Theological properties, and so can be incorporated readily into the systems additionally described below, such as paints, inks or the like, plastics, cosmetics or the like, and at the same time the uniform incorporation of the dispersion of the invention into the composition to be provided therewith is ensured. In this way it is possible to furnish the compositions or systems provided with the dispersion of the invention with enhanced mechanical properties, such as scratch resistance or the like, and/or an enhanced stability, more particularly UV stability.

The stabilizers used in accordance with the invention are per se products that are available commercially (e.g. BYK-Chemie, Germany) and whose preparation is known per se to the skilled person.

Through the controlled use of specific stabilizers based on modified, more particularly hydrophobically modified, preferably urea-modified polyurethanes, and of modified ureas, more particularly urea urethanes, it is in fact possible to carry out effective dispersion, with long-term stability, even of nanoparticles of particularly high density, such as zinc oxide or the like, for example, which are extremely problematic in their sedimentation behaviour, thereby making it possible to provide storage-stable disperse systems even for such problematic nanoparticles.

Without wishing to be tied to this theory, the mode of action of the stabilizers used in accordance with the invention and based on modified, more particularly hydrophobically modified, preferably urea-modified polyurethanes and/or on modified ureas, more particularly urea urethanes, may be understood as being that the aforementioned stabilizers to a certain extent form a matrix or network in the dispersion of the invention, in which the nanoparticles are then "so to speak" intercalated, so that they do not undergo premature sedimentation. In this context the applicant, entirely surprisingly, has discovered that, despite the formation of the above-described matrix-like or network-like structure by the stabilizers, the rheological properties or flow properties of the dispersion of the invention are not adversely affected in respect of its application and incorporability into the systems described above.

In other words, therefore, the stabilizers used inventively in the context of the dispersion according to the invention lead to outstanding sedimentation prevention properties of the dispersed inorganic nanoparticles in the dispersion of the invention, in conjunction with low viscosity, or viscosity optimized in terms of the intended use of the dispersion of the invention, of the dispersion according to the invention as such. The stabilizers used in accordance with the invention thus lead to a significant improvement in the stability and sedimentation behaviour of the dispersion of the invention and thus critically increase its in-can consistency. The stabilizers used in accordance with the invention are present more particularly in a liquid form and are therefore easy to manage. Moreover, the stabilizers are at least substantially free from VOCs (Volatile Organic Compound(s)). Furthermore, the stabilizers used are at least substantially free from alkylphenol ethoxylates (APEOs) which are problematic on the basis of their inadequate environmental compatibility.

The stabilizers used in accordance with the invention are also notable for an activity which is at least substantially independent of the pH. The stabilizers therefore do not require any pH monitoring. Furthermore, no temperature monitoring is needed in respect of the stabilizers of the invention. The stabilizers used in accordance with the invention are notable, furthermore, for the fact that they induce an immediate effect during the preparation of the dispersion of the invention and/or during incorporation into the dispersion of the invention with respect to the stabilization of sedimentation of the dispersion, so that a so-called "ageing time" is unnecessary. By virtue of the high activity of the stabilizers used in accordance with the invention, they generally require only a low level of addition in relation to the dispersion of the invention. When the dispersion of the invention is used in the manner intended, the stabilizers that are used in the context of the present invention, in comparison to other stabilizers of the prior art, such as natural or synthetic silicates, acrylate thickeners, fumed silica, etc., do not adversely affect the water resistance of the above-described compositions or systems, such as paints, for example, into which the dispersion of the invention is incorporated. Furthermore, the stabilizers used in accordance with the invention do not influence the gloss of the above-described compositions or systems, such as paints, into which the dispersion of the invention is incorporated.

All in all, therefore, the dispersions of the invention unite the positive properties of outstanding stability by virtue of improved sedimentation behaviour of the nanoparticles dispersed in the dispersion according to the invention, on the one hand, with an improvement—an improvement which is significant on corresponding incorporation or addition thereof—in the mechanical properties and/or stability of compositions and/or systems of the aforementioned kind, on the other hand; there are improvements more particularly not only in the wear resistance, more particularly the scratch resistance, but also in the UV stability of the products obtained, in tandem with good gloss.

As far as the dispersion of the invention is concerned, it has emerged as being particularly advantageous in the context of the present invention if (i) the modified polyurethane is added in amounts of 0.002% to 5% by weight, more particularly 0.005% to 2% by weight, preferably 0.01% to 1% by weight, more preferably 0.05% to 0.75% by weight, very preferably 0.1% to 0.5% by weight, based on the dispersion. As indicated above, it is possible on an ad hoc or application-related basis to deviate from the aforementioned quantities, without departing from the scope of the present invention.

As far as the amount of modified ureas, more particularly urea urethanes, present (ii) in the dispersion of the invention is concerned, it may vary within wide ranges. Generally speaking, (ii) the modified urea, more particularly the urea urethane, ought to be added in amounts of 0.001% to 2% by weight, more particularly 0.002% to 1.5% by weight, preferably 0.01% to 1% by weight, more preferably 0.05% to 0.3% by weight, based on the dispersion.

In accordance with an embodiment which is particularly preferred in accordance with the invention, the dispersion of the invention has as its stabilizer a combination of (i) modified polyurethane and (ii) modified urea, more particularly urea urethane. This is because the applicant has in this context found, entirely surprisingly, that the controlled addition both of (i) modified polyurethane on the one hand and (ii) of modified urea, more particularly urea urethane, on the other results in particularly good effects in terms of the stabilization of the inorganic nanoparticles that are dispersed in the dispersion of the invention, and hence in particularly good stability on the part of the dispersion of the invention as such. In this context a large part is also played by the weight-based proportion of (i) modified polyurethanes on the one hand and (ii) modified ureas, more particularly urea urethanes, on the other in the dispersion of the invention with respect to its stabilization. Hence the applicant has been able to show that particularly good results in terms of the stabilization of the dispersion of the invention are obtained when the combination of (i) modified polyurethanes and (ii) modified ureas, more particularly urea urethanes, is added in a weight-based proportion of (i) to (ii) of ≧1:1, more particularly ≧2:1, preferably ≧3:1, more particularly when the combination is added in a weight-based proportion of (i) to (ii) in the range from 10:1 to 1:1, more particularly 7:1 to 1.5:1, preferably 6:1 to 2:1, more preferably 5:1 to 3:1. In accordance with one embodiment which is particularly preferred in accordance with the invention, the combination of (i) and (ii) is added in a weight-based proportion of (i) to (ii) of approximately 4:1.

Without wishing to be tied to this theory, the specific binary combination of the above-described stabilizers (i) and (ii) leads to formation of the network or matrix structure in the dispersion that is further optimized in terms of the stabilization, and which can be optimized still further through the controlled selection of the weight-based proportion of (i) to (ii), with the consequence that, all in all, this permits a further-improved storage stability on the part of the dispersion of the invention, which is attributable to the synergistic interaction of the two stabilizers (i) and (ii).

As far as the total amount of the combination of (i) modified polyurethane and (ii) modified urea, more particularly urea urethane, in the dispersion of the invention is concerned, the dispersion may contain the combination of (i) modified polyurethane and (ii) modified urea, more particularly urea urethane, in a total amount of 0.003% to 7% by weight, more particularly 0.005% to 5% by weight, preferably 0.01% to 3% by weight, more preferably 0.1% to 2% by weight, based on the dispersion.

In accordance with one inventively preferred embodiment (i) the modified polyurethane and (ii) the modified urea, more particularly the urea urethane, have average molecular weights which differ from one another. In this context it has proven to be particularly advantageous if the ratio of the average molecular weight (i) of the modified polyurethane to the average molecular weight (ii) of the modified urea, more particularly urea urethane, is at least 5, more particularly at least 7.5, preferably at least 10, and in particular if the ratio of the average molecular weight (i) of the modified polyurethane to the average molecular weight (ii) of the modified urea, more particularly urea urethane, is in the range from 2 to 50, more particularly 5 to 40, preferably 7.5 to 30. By this means it is possible to improve still further the sedimentation properties of the dispersion of the invention and/or its long-term stability.

The (i) modified polyurethane ought preferably to have an average molecular weight in the range from 5000 to 25 000 Da, more particularly 7000 to 20 000 Da, preferably 9000 to 18 000 Da, more preferably 10 000 to 16 000 Da, very preferably 12 000 to 15 000 Da.

The applicant has now surprisingly discovered that particularly good results can be obtained when, in the inventive dispersion, in relation to the (i) modified polyurethane, compounds according to the general formula (I')

(formula (I'))

are used, where in the formula (I')
the radical X is an aliphatic or cycloaliphatic radical having 3 to 6 hydroxyl groups and
the radicals $Y_1$, $Y_2$, $Y_3$, $Y_4$, $Y_5$ and $Y_6$, in each case independently of one another, are a radical of the following general formula

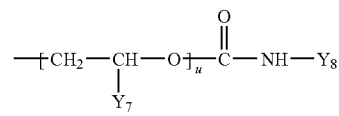

where in the above-identified formula $Y_7$, independently at each occurrence, is hydrogen or methyl and $Y_8$ is a $(C_2\text{-}C_{22})$-alkyl radical and u is 1 to 100.

If $Y_7$ is hydrogen, then in the above-stated formula there are more particularly ethylene oxide (EO) units in the number u. If $Y_7$ is methyl, there are in the above-stated formula more particularly propylene oxide (PO) units in the number u. Within the above-identified formula it is possible for there to be combinations of different radicals or groups, more particularly EO units and PO units in a defined ratio, more particularly molar ratio.

Without wishing to restrict it thereto, the radical X of the formula (I') may be selected for example from the group of trimethylolpropane (TMP), pentaerythritol (penta), dipentaerythritol (dipenta) and sorbitol. In the inventive dispersion it is also possible to use mixtures and/or combinations of different compounds of the aforementioned formula (I'). As far as the above formula (I') is concerned, it is preferred to use integers from the specified range of values, in relation to the variable u. Compounds of the general formula (I') can be prepared in a manner known per se to the skilled worker, more particularly by alkoxylation of the radical X and subsequent reaction with a monoisocyanate of the radical $Y_8$.

The applicant has surprisingly discovered, moreover, that particularly good results can be obtained even when, in the inventive dispersion, in relation to the (i) modified polyurethane, the following compounds of the general formula (I)

(formula (I))

are used, where in the formula (I) the radicals $R_1$, $R_2$, $R_3$ and $R_4$, in each case independently of one another, are a radical of the following general formula

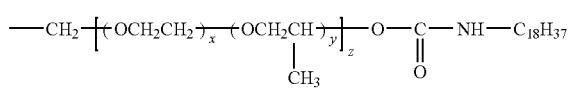

where in the above-identified formula x is 4, y is 1 and z is 5 to 25. In the inventive dispersion it is also possible to use mixtures and/or combinations of different compounds of the aforementioned formula (I)—including in a mixture and/or combination of compounds of the formula (I'). As far as the above formula (I) is concerned, it is preferred to use integers from the specified range of values in respect of the variables x, y and z.

For further observations on the modified polyurethanes (i) used in accordance with the invention and also on their preparation, reference may be made to U.S. Pat. No. 4,079,028 A, the entire relevant disclosure content of that publication being hereby incorporated by reference. The modified polyurethanes, more particularly of the above general formula (I') and formula (I), may be prepared, for example, in accordance with the working examples, more particularly in accordance with working example 103, of U.S. Pat. No. 4,079,028 A.

Also playing a certain part with respect to the controlled increase in storage stability and improvement in sedimentation properties of the dispersion of the invention is the average molecular weight of the (ii) modified urea which can be used as a stabilizer in the context of the inventive dispersion. Hence, in the context of the present invention, it has proved to be particularly advantageous if the (ii) modified urea, more particularly the urea urethane, has an average molecular weight in the range from 500 to 3000 Da, more particularly 750 to 2500 Da, preferably 1000 to 2000 Da, preferably 1250 to 1750 Da, very preferably 1500 to 1600 Da.

Particularly good results in terms of the storage properties of the dispersion of the invention can be achieved more particularly when (ii) the modified urea, more particularly the urea urethane, corresponds to the below-specified compounds of the general formula (II)

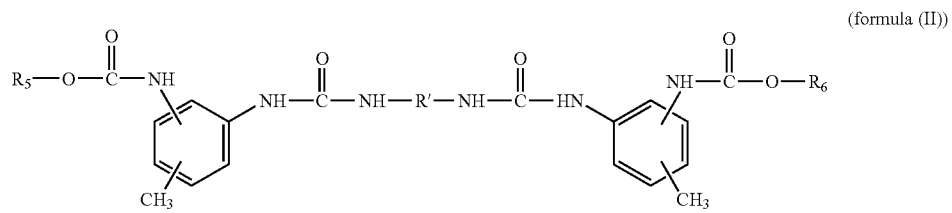
(formula (II))

where in the formula (II)
R' identifies one of the following radicals:
—$C_pH_{2p}$— where p=2 to 12;
—$(C_qH_{2q}$—O—$C_qH_{2q})_r$— where q=2 to 4 and r=1 to 10;

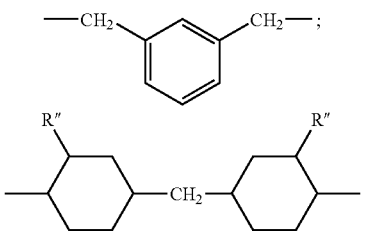

where R" is H or $CH_3$;

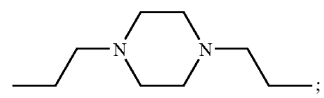

$R_5$ and $R_6$, in each case independently of one another, are one of the following radicals:
an n-alkyl radical or an isoalkyl radical having 4 to 22 C atoms;
an alkenyl radical having 3 to 18 C atoms;
a cycloalkyl radical;
an aralkyl radical;
a radical of the formula $C_mH_{2m+1}(O$—$C_nH_{2n})_x$—, where m is 1 to 22, n is 2 to 4 and x is 1 to 15;
a radical of the formula $C_mH_{2m+1}(OOC$—$C_vH_{2v})_x$—, where m is 1 to 22, n is 2 to 4,
x is 1 to 15 and v=4 or 5;
a radical of the formula $Z$—$C_6H_4(O$—$C_nH_{2n})_x$—, where n is 2 to 4, x is 1 to 15 and Z identifies an alkyl radical having 1 to 12 C atoms.

In accordance with one particularly preferred embodiment, the dispersion of the invention can take a form such that (ii) the modified urea, more particularly the urea urethane, is of the general formula (II')

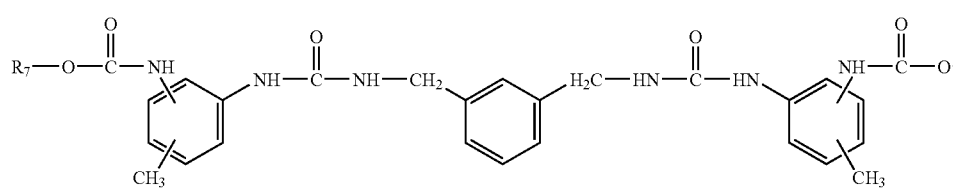

(formula (II'))

where in the formula (II')
R₇ and R₈, in each case independently of one another, are one of the following radicals:

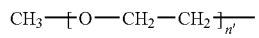

where n'=7 to 16 or

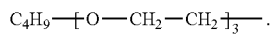

For further observations on the modified ureas and urea urethanes (ii) used in accordance with the invention, more particularly on the modified ureas used with preference in accordance with the invention, more particular urea urethanes, of the general formulae (II) and (II') above, and also on their preparation, reference may be made more particularly to the applicant's own German patent DE 100 39 837 C2 and also the parallel US documents U.S. Pat. No. 6,617,468 B2 and US 2002/115882 A1, the entire relevant disclosure content of all of the aforementioned publications being hereby incorporated by reference.

As far as the above formulae (II) and (II') are concerned, in respect of the variables p, q, r, m, n, v, x and n' identified therein it is preferred in each case to use integers from the ranges of values specified above.

As indicated above, the viscosity of the inventive dispersion plays a decisive part on the one hand in terms of increasing the storage stability and on the other hand in terms of good processing properties and incorporation into compositions or systems that are to be furnished with it, such as paints or the like. In this context the dispersion ought to have a dynamic Brookfield viscosity in accordance with ASTM D 2196 at 5 rpm and 23° C. of not more than 25 000 mPa·s, more particularly not more than 20 000 mPa·s. In this respect reference is also made to what is called the low shear range, the detection of the aforementioned viscosity values taking place using a spindle of type 4 (spindle 4). This also applies to all subsequent viscosity figures.

More particularly the inventive dispersion ought to have a dynamic Brookfield viscosity in accordance with ASTM D 2196 at 5 rpm and 23° C. in the range from 1000 to 25 000 mPa·s, more particularly 1250 to 20 000 mPa·s, preferably 1500 to 15 000 mPa·s, more preferably 2000 to 10 000 mPa·s.

Besides the above-specified viscosity values in what is called the low shear range, the viscosity values in the higher or high shear range also have a decisive part to play: hence the dispersion ought to have a dynamic Brookfield viscosity in accordance with ASTM D 2196 at 50 rpm and 23° C. of not more than 7 000 mPa·s, more particularly not more than 5000 mPa·s. In this context the dispersion of the invention ought more particularly to have a dynamic Brookfield viscosity in accordance with ASTM D 2196 at 50 rpm and 23° C. in the range from 500 to 7000 mPa·s, more particularly 750 to 6000 mPa·s, preferably 900 to 5000 mPa·s, more preferably 1000 to 4000 mPa·s.

As described earlier, the dispersion of the invention comprises inorganic nanoparticles. As far as the inorganic nanoparticles present in the dispersion of the invention are concerned, their particle size may vary within wide ranges. In general the inorganic nanoparticles have particle sizes in the range from 0.5 to 2000 nm, more particularly 1 to 1000 nm, preferably 2 to 750 nm, more preferably 2 to 500 nm, with particular preference 5 to 300 nm and very preferably 5 to 100 nm. The particle sizes may be determined for example by means of transmission electron microscopy, light scattering methods or the like.

On account of the inventive concept using specific stabilizers of the type described above it is possible in accordance with the invention to provide stable dispersions which are storage-stable even when high-density inorganic nanoparticles are incorporated. In this context the density of the inorganic nanoparticles may be at least 2 g/cm³, more particularly at least 3 g/cm³, preferably at least 4 g/cm³, with particular preference at least 5 g/cm³ and very preferably at least 6 g/cm³.

More particularly the inorganic nanoparticles may be formed of at least one undoped or doped oxide, hydroxide, oxide hydroxide, sulphate, phosphate, sulphide, carbonate, nitride, silicate, carbide, vanadate, molybdate, tungstate and/or halide, more particularly fluoride, of at least one metal or semi-metal or else of a metal/element or else of mixtures or combinations of such compounds, preferably of at least one inorganic oxide, hydroxide or oxide hydroxide, more preferably an inorganic oxide, or may comprise this or these compounds.

Preferably the inorganic nanoparticles may be formed of at least one undoped or doped oxide, hydroxide and/or oxide hydroxide, preferably oxide, of aluminium, silicon, zinc, titanium, cerium, indium, antimony, tin and/or iron, an alkaline earth metal sulphate, an alkaline earth metal phosphate or lanthanum phosphate, a cadmium or zinc sulphide, an alkaline earth metal carbonate, an aluminium or silicon nitride, an alkaline earth metal silicate, a silicon carbide or silver, or else of mixtures or combinations of such compounds, or may comprise this or these compounds.

With regard to the dispersion of the invention it is particularly preferred if the inorganic nanoparticles are formed of at least one undoped or doped oxide, hydroxide and/or oxide hydroxide, preferably oxide, of aluminium, silicon, zinc, titanium, cerium, indium, antimony, tin and/or iron or comprise this or these compounds.

In particular it may be provided, in the context of the present invention, for the inorganic nanoparticles to be formed on the basis of zinc oxide, indium/tin oxides (ITO) or antimony/tin oxides (ATO) and/or for the inorganic nanoparticles to be zinc oxide particles, indium/tin-oxidic particles (ITO particles) or antimony/tin-oxidic particles.

In accordance with one particular embodiment it may be provided for the inorganic nanoparticles to be of surface-modified form, more particularly surface-modified by means of polysiloxane groups. Surface modification of this kind may take place for example by means of polysiloxane groups; in other words, in this embodiment, polysiloxane groups are applied on or to the surface of the nanoparticles, preferably by means of physical and/or chemical bonding, more particularly by means of chemical covalent bonding.

The corresponding surface modification by means of polysiloxane groups has the effect of an even further increase or improvement in the application properties of the dispersions of the invention, particularly when they are incorporated into coating materials and coating systems. More particularly the surface modification, preferably with polysiloxane groups, leads to a reduced sedimentation tendency and gel-forming tendency on the part of the dispersions of the invention. In addition, embrittlement of the dried or cured coating system is efficiently counteracted. The surface modification has the advantage, furthermore, that, on incorporation into coating systems, there is an advantageous effect on interaction with the binder, and in this way transparency and refractive index are improved still further relative to non-surface-modified particles—more particularly, as a result of the reduced difference in refractive index, the light scattering that occurs is much less.

The surface modification, more particularly by means of polysiloxane groups, is known fundamentally to the skilled person from the prior art. In this respect reference may be made to the applicant's own patent applications DE 10 2005 006 870 A1 or EP 1 690 902 A2 and DE 10 2007 030 285 A1 or PCT/EP 2007/006273, the entirety of whose disclosure content is hereby incorporated by reference. All of the aforementioned publications relate to the surface modification of surfaces of metal or semi-metal oxide or hydroxide by means of polysiloxanes, advantageously through formation of chemical bonds, more particularly covalent bonds.

In principle the dispersion of the invention may be aqueously based or comprise water as dispersion medium.

In addition, however, it is also possible in principle for the dispersion of the invention to have an organic basis or to comprise as dispersion medium at least one organic solvent.

In this context the amount of the dispersion medium in the dispersion of the invention may vary within wide ranges. It is, however, particularly advantageous if the dispersion of the invention contains the dispersion medium, more particularly water, in amounts of 2% to 90% by weight, more particularly 5% to 80% by weight, preferably 10% to 70% by weight, more preferably 20% to 60% by weight, based on the dispersion medium.

Furthermore, the dispersions according to the present invention may also comprise at least one further ingredient and/or at least one additive, which may more particularly be selected from the group of preservatives, emulsifiers, defoamers, wetting agents, dispersants, antioxidants, stabilizers, neutralizing agents, rheology modifiers, organic solvents, solubilizers and biocides and also mixtures thereof. The aforementioned ingredients and additives are well known as such to the skilled person.

As far as the preservative is concerned, provision may be made in the context of the present invention for the dispersion according to the invention to comprise a preservative, more particularly a biocide, preferably a microbicide, preferably based on at least one isothiazole, the dispersion being able to contain the preservative more particularly in amounts of 0.001% to 3% by weight, more particularly 0.01% to 1% by weight, preferably 0.1% to 0.6% by weight, based on the dispersion. In this way it is possible effectively to prevent the dispersion of the invention becoming unusable, as a result for example of bacterial influence or fungal infestation, even in the course of prolonged storage.

Equally, provision may be made in accordance with the invention for the dispersion to comprise a defoamer, more particularly a silicone defoamer. This defoamer may be formed on the basis more particularly of at least one polysiloxane and/or at least one siloxylated polyether. The amount of defoamer in the dispersion in this respect may vary within wide ranges. In this context the dispersion may contain the defoamer in amounts of 0.001% to 2% by weight, more particularly 0.01% to 0.8% by weight, preferably 0.05% to 0.4% by weight, based on the dispersion. The addition of a defoamer leads to advantages in respect of the preparation of the dispersion of the invention; more particularly, any formation of foam during preparation of the dispersion, more particularly during the dispersing of the inorganic nanoparticles, is further reduced or eliminated.

The dispersion of the invention may equally comprise a wetting agent and/or dispersant. This may be more particularly a wetting agent and/or dispersant based on a quaternary ammonium compound, preferably on an alkylolammonium salt of a polymer with acid group functionalization. Equally or alternatively it is also possible to employ a wetting agent and/or dispersant based on a high-molecular block copolymer with groups having pigment affinity. The dispersion of the invention may contain the wetting agent or agents and/or dispersant or dispersants in amounts of 0.1% to 25% by weight, more particularly 1% to 20% by weight, preferably 5% to 15% by weight, based on the dispersion. It is equally possible as well to use mixtures of the aforementioned wetting agents and/or dispersants, in which case the total amount in this respect ought to conform to the quantity figures specified above.

In the context of the present invention, therefore, overall success has been achieved in providing a dispersion which is storage-stable, more particularly sedimentation-stable. By this is meant more particularly that, over a prolonged period of time, the inorganic nanoparticles that are present in dispersion undergo no—or at least no substantial—sedimentation or caking or settling, which would otherwise lead to the dispersion becoming unusable in the context of its intended use, as for example in paints or the like.

On the basis of the idea according to the invention, therefore, it is ensured in an effective way that the inorganic nanoparticles remain in dispersion over a long period, with the consequence, equally, that long usefulness of the stable dispersion according to the invention is ensured.

In this context the dispersion of the invention is storage-stable at a temperature of 20° C. and under atmospheric pressure (1013 mPa) over a storage period of at least 3 months, more particularly at least 6 months, preferably at least 9 months, more preferably at least 12 months.

Moreover, after a storage period of 6 months at a temperature of 20° C. and under atmospheric pressure (1013 mPa), less than 10% by weight, more particularly less than 5% by weight, preferably less than 3% by weight, of the inorganic nanoparticles, based on the inorganic nanoparticles, ought to have undergone sedimentation.

The dispersion according to the present invention may be designed or take the form, for example, of a coating material or coating system, more particularly paint, ink or the like, a cosmetic, more particularly nail varnish, an adhesive and a sealant.

Equally the dispersions according to the present invention may be designed or intended or used for incorporation into coating materials and coating systems, more particularly paints, inks or the like, into plastics, into foams, into cosmetics, more particularly nail varnishes, into adhesives and into sealants. Typically for this purpose the dispersions according to the present invention are used in amounts of 0.1% to 30% by weight, more particularly 0.5% to 20% by weight, preferably 1% to 10% by weight, based on the resulting overall system.

The present invention also relates to a process for preparing the stabilized dispersion of the invention. As far as the preparation process for the stabilized dispersion of the invention is concerned, the typical procedure is first to prepare, in a manner known per se to the skilled person, a non-stabilized dispersion of the inorganic nanoparticles in question, where appropriate with addition of the aforementioned additives and ingredients. Subsequently, preferably with introduction of shearing forces (for example using stirrers, mixers, dissolvers, etc.), the stabilizer or stabilizers envisaged in accordance with the invention is or are incorporated, preferably homogeneously, in the quantities specified in accordance with the invention. This procedure has the advantage more particularly that conventional or commercially customary dispersions of inorganic nanoparticles can be modified retrospectively, provided that they have not yet become fully overlaid (e.g., there is no complete agglomeration of the individual particles, with the consequence that redispersion is no longer possible). For further details on the preparation of the stabilized dispersion of the invention, reference may be made, in order to avoid unnecessary repetition, to the above observations on the stabilized dispersion according to the invention, which apply accordingly in relation to the preparation process. Furthermore, in addition, it is possible to refer to the working examples below.

Additionally provided by the present invention, in accordance with a second aspect of the present invention, is the use of the dispersion of the invention in coating materials and coating systems, more particularly paints, varnishes and the like, in dispersions of all kinds, in plastics, in foams, in cosmetics, more particularly nail varnishes, in adhesives and in sealants.

The stabilized dispersion of the invention may be used more particularly for the purpose of improving the mechanical properties, more particularly for raising the wear resistance, preferably the scratch resistance and/or abrasion resistance, in the systems referred to above. More particularly the dispersion of the invention can also be used for improving the UV stability and/or for improving the weathering properties of the systems provided with the dispersion of the invention, and/or for improving the optical properties, such as refractive index, and/or for optical identification by means more particularly of luminescent substances, in the context for example of security markings.

Typically, in accordance with this aspect of the invention, the dispersion according to the present invention is used in amounts of 0.1% to 30% by weight, more particularly 0.5% to 20% by weight, preferably 1% to 10% by weight, based on the resulting overall system.

Further provided by the present invention, in accordance with a third aspect of the present invention, are coating materials and coating systems, more particularly paints, inks and the like, plastics, foams, cosmetics, more particularly nail varnishes, adhesives and sealants which comprise the above-defined and -described dispersions according to the invention.

In general, in accordance with this aspect of the invention as well, the dispersion according to the present invention is used in amounts of 0.1% to 30% by weight, more particularly 0.5% to 20% by weight, preferably 1% to 10% by weight, based on the resulting overall system.

Further provided by the present invention, finally, in accordance with a fourth aspect of the present invention, is a method of stabilizing a dispersion of inorganic nanoparticles, the dispersion comprising inorganic nanoparticles in a dispersion medium, the method of the invention being distinguished by the fact that there is added to the dispersion at least one stabilizer from the group of
(i) modified, more particularly hydrophobically modified, preferably urea-modified polyurethanes and
(ii) modified ureas, more particularly urea urethanes, and also mixtures thereof.

In this connection it is also possible for provision to be made, in the context of the method of the invention, to stabilize a non-stable or non-stabilized dispersion of inorganic nanoparticles retrospectively by adding the aforementioned stabilizers based on urea-modified polyurethanes and/or modified ureas, more particularly urea urethanes, to a non-stabilized dispersion prepared in a manner known per se to the skilled person. This may be carried out, for example, with introduction of shearing forces, by means of stirring, for example, in conventional apparatus, such as a mixer, dissolver, etc., for example.

In the context of the present invention, success has been achieved overall in providing a stabilized dispersion of inorganic nanoparticles which, by virtue of the controlled addition of at least one specific stabilizer, possesses excellent storage stability and hence does not tend towards premature sedimentation. Moreover, the dispersions of the invention can be incorporated outstandingly, in the context of their intended use, for example, into coating materials and coating systems, more particularly paints, inks and the like, but also into plastics, foams and cosmetics, leading likewise to a significant improvement in product properties in terms, for example, of the mechanical properties, such as scratch resistance, and the stability, such as UV stability. In this case it is ensured in the context of the present invention, furthermore, that other required application properties of the systems provided or furnished with the dispersion of the invention are not adversely affected (e.g. gloss behaviour, surface smoothness, adhesion capacity, etc.).

Further embodiments, modifications and variations of the present invention are readily recognizable and realizable for a person skilled in the art on reading the description, without departing from the confines of the present invention.

The present invention is illustrated by reference to the working examples which follow, but which are by no means intended to restrict the present invention.

WORKING EXAMPLES

Working Examples I

The products of the general formula (I') are prepared in the manner described in Working Example 103 of U.S. Pat. No. 4,079,028 A.

TABLE 1

Products of the general formula (I')

| Example | X | EO/PO ($Y_7$ = H/CH$_3$) | $Y_8$ |
|---------|---|--------------------------|-------|
| A | TMP | 223/45 | $C_{18}$ |
| B | pentaerythritol | 265/66 | $C_{18}$ |
| C | dipentaerythritol | 300/75 | $C_{18}$ |

TABLE 1-continued

Products of the general formula (I')

| Example | X | EO/PO (Y$_7$ = H/CH$_3$) | Y$_8$ |
|---------|---|---|---|
| D | sorbitol | 155/0 | C$_{18}$ |
| E | pentaerythritol | 177/44 | C$_{18}$ |
| F | TMP | 245/50 | C$_{18}$ |

The products of the general formula (II') are prepared as described in DE 100 39 837 C2.

TABLE 2

Products of the general formula (II')

| Example | R$_7$ | R$_8$ | Molar ratio |
|---------|---|---|---|
| G | butyl triglycol | isotridecyl | 1:1 |
| H | butyl triglycol | MPEG 500 | 1:1.75 |
| I | butyl triglycol | MPEG 350 | 1:1.5 |
| J | butyl triglycol | MPEG 350/MPEG 500 (1:1) | 1:1 |
| K | MPEG 350 | MPEG 500 | 1:2 |

PREPARATION EXAMPLES

Example 1

Preparation of a Non-Stabilized Dispersion of Inorganic Nanoparticles (Comparative)

An aqueous-based dispersion of zinc oxide nanoparticles (average particle diameter D$_{50}$: about 60 nm) is prepared. For this purpose, in a manner known per se to the skilled person, 50.5 g of ZnO nanoparticles are dispersed in an aqueous-based dispersion medium made up of 37.87 g of water, 0.1 g of defoamers, 0.3 g of preservative and 11.22 g of wetting agents and/or dispersants. This results in a non-inventive, aqueous-based, non-stabilized dispersion of ZnO nanoparticles with a solids content of 50.5% by weight. The storage stability properties and sedimentation properties are set out below.

Example 2

Preparation of Stabilized Dispersions of Inorganic Nanoparticles with Hydrophobically Modified Polyurethane Stabilizer (Inventive)

Starting from the dispersion of Working Example 1, inventive stabilized dispersions of inorganic nanoparticles are prepared with varying amounts of stabilizer. For this purpose, varying amounts of a hydrophobically modified polyurethane (i) of the above formula (I') ("stabilizer I") are added to the dispersion from Example 1 and incorporated homogeneously therein with introduction of shearing forces. This results in inventive stabilized dispersions of inorganic nanoparticles with a hydrophobically modified polyurethane stabilizer. The relevant storage stability properties and sedimentation properties of the resulting inventive dispersions are set out below.

Example 3

Preparation of Stabilized Dispersions of Inorganic Nanoparticles with Modified Urea Stabilizer (Inventive)

Starting from the dispersion of Working Example 1, inventive stabilized dispersions of inorganic nanoparticles are prepared with varying amounts of stabilizer. For this purpose, varying amounts of a modified urea (ii) of the above formula (II') ("stabilizer II") are added to the dispersion from Example 1 and incorporated homogeneously therein with introduction of shearing forces. This results in inventive stabilized dispersions of inorganic nanoparticles with a modified urea stabilizer. The relevant storage stability properties and sedimentation properties of the resulting inventive dispersions are set out below.

Example 4

Preparation of Stabilized Dispersions of Inorganic Nanoparticles with a Combination of Hydrophobically Modified Polyurethane and Modified Urea as Joint Stabilizers (Inventive)

Starting from the dispersion of Working Example 1, inventive stabilized dispersions of inorganic nanoparticles are prepared with varying amounts of stabilizer. For this purpose, varying amounts of a combination (i) of a hydrophobically modified polyurethane of above formula (I') and (ii) of a modified urea of the above formula (II') (molar weight ratio of stabilizer I/stabilizer II>5) as joint stabilizers (costabilizers) in varying proportions of stabilizer I/stabilizer II or stabilizer (i)/stabilizer (ii) are added to the dispersion from Example 1 and incorporated homogeneously therein with introduction of shearing forces. This results in inventive stabilized dispersions of inorganic nanoparticles with a hydrophobically modified polyurethane and a modified urea as joint stabilizers. The relevant storage stability properties and sedimentation properties of the resulting inventive dispersions are set out below.

USE EXAMPLES

The dispersions prepared above were subjected subsequently to an accelerated ageing test for the purposes of the assessment of the storage stability or sedimentation tendency and also the rheological properties. The results are reproduced in the tables which follow, using in each case a rating system with ratings from 1 to 5.

TABLE 3

| | After 24 hours' storage at 50° C. | | After 5 days' storage at 50° C. | | After 14 days' storage at 50° C. | |
|---|---|---|---|---|---|---|
| | Rheology | Sediment | Rheology | Sediment | Rheology | Sediment |
| Ex. 1 (comparative) | 1-2 | 4 | 2 | 4-5* | 2 | 5** |
| Ex. 2 | | | | | | |
| 0.001% by wt. Ex. B | 1-2 | 2-3 | 2 | 3 | 2 | 4* |

TABLE 3-continued

| | | | | | | |
|---|---|---|---|---|---|---|
| 0.4% by wt. Ex. B | 1-2 | 1-2 | 2 | 2 | 2 | 2-3 |
| 8% by wt. Ex. B | 3-4 | 1-2 | 3-4 | 2 | 3-4 | 2 |
| Ex. 3 | | | | | | |
| 0.0005% by wt. Ex. J | 1-2 | 2-3 | 2 | 3 | 2 | 4* |
| 0.3% by wt. Ex. J | 1-2 | 1-2 | 2 | 2 | 2-3 | 2-3 |
| 5% by wt. Ex. J | 4 | 1-2 | 4 | 2 | 4 | 2-3 |
| Ex. 4 | | | | | | |
| 0.5% by wt. total (stab. B + J) stab. B/stab. J = about 1:1 | 1-2 | 1 | 1-2 | 1-2 | 2 | 2 |
| 0.5% by wt. total (stab. B + J) stab. B/stab. J = about 4:1 | 1 | 1 | 1 | 1 | 1-2 | 1 |
| 0.5% by wt. total (stab. B + J) stab. B/stab. J about 10:1 | 1-2 | 1 | 1-2 | 1-2 | 2 | 2 |
| 1% by wt. total (stab. B + J) stab. B/stab. J about 4:1 | 1 | 1 | 1 | 1 | 1-2 | 1-2 |

Sediment: 1 = no sediment
5 = much sediment
Rheology: 1 = low-viscosity
5 = compact

TABLE 4

| | After 24 hours' storage at 50° C. | | After 5 days' storage at 50° C. | | After 14 days' storage at 50° C. | |
|---|---|---|---|---|---|---|
| | Rheology | Sediment | Rheology | Sediment | Rheology | Sediment |
| Ex. 1 (comparative) | 1-2 | 4 | 2 | 4-5* | 2 | 5** |
| Ex. 2 | | | | | | |
| 0.001% by wt. Ex. D | 2 | 3 | 3 | 4 | 3 | 4* |
| 0.4% by wt. Ex. D | 2 | 2 | 2-3 | 2-3 | 2-3 | 2-3 |
| 8% by wt. Ex. D | 3-4 | 2 | 4 | 3 | 4 | 3 |
| Ex. 3 | | | | | | |
| 0.0005% by wt. Ex. G | 2 | 3 | 2 | 3 | 2 | 4* |
| 0.3% by wt. Ex. G | 2 | 1-2 | 2 | 2 | 2-3 | 2-3 |
| 5% by wt. Ex. G | 4 | 1-2 | 4 | 2 | 4 | 2-3 |
| Ex. 4 | | | | | | |
| 0.5% by wt. total (stab. D + G) stab. D/stab. G = about 1:1 | 2 | 1 | 2 | 1-2 | 2 | 2-3 |
| 0.5% by wt. total (stab. D + G) stab. D/stab. G = about 4:1 | 1-2 | 1-2 | 2 | 2 | 2 | 3 |
| 0.5% by wt. total (stab. D + G) stab. D/stab. G about 10:1 | 1-2 | 2 | 1-2 | 2 | 2-3 | 2 |
| 1% by wt. total (stab. D + G) | 1 | 1-2 | 1-2 | 1-2 | 1-2 | 1-2 |

TABLE 4-continued stab. D/stab. G
about 4:1

Sediment: 1 = no sediment
5 = much sediment
Rheology: 1 = low viscosity
5 = compact

TABLE 5

| | After 24 hours' storage at 50° C. | | After 5 days' storage at 50° C. | | After 14 days' storage at 50° C. | |
|---|---|---|---|---|---|---|
| | Rheology | Sediment | Rheology | Sediment | Rheology | Sediment |
| Ex. 1 (comparative) | 1-2 | 4 | 2 | 4-5* | 2 | 5** |
| Ex. 2 | | | | | | |
| 0.001% by wt. Ex. E | 1-2 | 2-3 | 2 | 3 | 3 | 4* |
| 0.4% by wt. Ex. E | 2 | 2 | 2 | 3 | 2 | 3 |
| 8% by wt. Ex. E | 3-4 | 2-3 | 3-4 | 2-3 | 3-4 | 3 |
| Ex. 3 | | | | | | |
| 0.0005% by wt. Ex. H | 1-2 | 2-3 | 2 | 3 | 2 | 4* |
| 0.3% by wt. Ex. H | 1-2 | 1-2 | 2 | 3 | 3 | 4* |
| 5% by wt. Ex. H | 4 | 2 | 4 | 2 | 4 | 2-3* |
| Ex. 4 | | | | | | |
| 0.5% by wt. total (stab. E + H) stab. E/stab. H = about 1:1 | 2 | 1 | 2 | 1-2 | 3 | 2 |
| 0.5% by wt. total (stab. E + H) stab. E/stab. H = about 4:1 | 1 | 1 | 1 | 1 | 1-2 | 1 |
| 0.5% by wt. total (stab. E + H) stab. E/stab. H about 10:1 | 1-2 | 1 | 2 | 1-2 | 2 | 2 |
| 1% by wt. total (stab. E + H) stab. E/stab. H about 4:1 | 1 | 1 | 1 | 1 | 2 | 1-2 |

Sediment: 1 = no sediment
5 = much sediment
Rheology: 1 = low viscosity
5 = compact
*slight synaresis
**complete sedimentation, synaresis, redispersion not possible Tables 3 to 5 above show that with the inventively employed stabilizers I and II it is possible to achieve a significant improvement in the storage stability and a significant reduction in the sedimentation tendency of the above dispersions. A particularly good effect, which goes beyond the individual effect of the respective stabilizers and is therefore evaluated as a synergistic effect, can be achieved through the joint use of both stabilizers, with an optimization of the effect being achievable through controlled selection of the relevant proportion.

The results show, furthermore, that the stabilizers used in accordance with the invention leave the rheological properties or flow capacity properties at least substantially unchanged or altered only to an extent such that use as intended continues to be possible.

Furthermore, the viscosity behaviour of a selected dispersion was monitored after different periods of storage. The results are shown in Table 6 below and indicate that the viscosity properties of the stabilized dispersions remain substantially unaltered when the inventive stabilizers are employed.

TABLE 6

| Ex. 4 0.5% by wt. stab. B + J total | Brookfield viscosity (23° C.) spindle 4 (ASTM D 2196) | |
|---|---|---|
| (stab. B/stab. J about 4:1) | 5 rpm | 50 rpm |
| after 24 hours' storage at 50° C. | 2090 mPas | 1001 mPas |

TABLE 6-continued

| Ex. 4 0.5% by wt. stab. B + J total | Brookfield viscosity (23° C.) spindle 4 (ASTM D 2196) | |
|---|---|---|
| (stab. B/stab. J about 4:1) | 5 rpm | 50 rpm |
| after 7 days' storage at 50° C. | 2120 mPas | 1016 mPas |
| after 14 days' storage at 50° C. | 2150 mPas | 1046 mPas |

WORKING EXAMPLES II

Preparation Examples

Example 1'

Preparation of a Non-Stabilized Dispersion of Inorganic Nanoparticles (Comparative)

An aqueous-based dispersion of zinc oxide nanoparticles (average particle diameter $D_{50}$: about 60 nm) is prepared. For this purpose, in a manner known per se to the skilled person, 50.5 g of ZnO nanoparticles are dispersed in an aqueous-based dispersion medium made up of 37.87 g of water, 0.1 g of defoamers, 0.3 g of preservative and 11.22 g of wetting agents and/or dispersants. This results in a non-inventive, aqueous-based, non-stabilized dispersion of ZnO nanoparticles with a solids content of 50.5% by weight. The storage stability properties and sedimentation properties are set out below.

Example 2'

Preparation of Stabilized Dispersions of Inorganic Nanoparticles with Urea-Modified Polyurethane Stabilizer (Inventive)

Starting from the dispersion of Working Example 1', inventive stabilized dispersions of inorganic nanoparticles are prepared with varying amounts of stabilizer. For this purpose, varying amounts of a urea-modified polyurethane (i) of the above formula (I) ("stabilizer I") are added to the dispersion from Example 1' and incorporated homogeneously therein with introduction of shearing forces. This results in inventive stabilized dispersions of inorganic nanoparticles with a urea-modified polyurethane stabilizer. The relevant storage stability properties and sedimentation properties of the resulting inventive dispersions are set out below.

Example 3'

Preparation of Stabilized Dispersions of Inorganic Nanoparticles with Modified Urea (Urea Urethane) Stabilizer (Inventive)

Starting from the dispersion of Working Example 1', inventive stabilized dispersions of inorganic nanoparticles are prepared with varying amounts of stabilizer. For this purpose, varying amounts of a modified urea based on a urea urethane (ii) of the above formula (II') ("stabilizer II") are added to the dispersion from Example 1' and incorporated homogeneously therein with introduction of shearing forces. This results in inventive stabilized dispersions of inorganic nanoparticles with a modified urea (urea urethane) stabilizer. The relevant storage stability properties and sedimentation properties of the resulting inventive dispersions are set out below.

Example 4'

Preparation of Stabilized Dispersions of Inorganic Nanoparticles with a Combination of Urea-Modified Polyurethane and Modified Urea (Urea Ureathane) as Joint Stabilizers (Inventive)

Starting from the dispersion of Working Example 1', inventive stabilized dispersions of inorganic nanoparticles are prepared with varying amounts of stabilizer. For this purpose, varying amounts of a combination (i) of a urea-modified polyurethane of above formula (I) and (ii) of a modified urea based on a urea urethane of the above formula (II') (molar weight ratio of stabilizer I/stabilizer II>5) as joint stabilizers (costabilizers) in varying proportions of stabilizer I/stabilizer II or stabilizer (i)/stabilizer (ii) are added to the dispersion from Example 1' and incorporated homogeneously therein with introduction of shearing forces. This results in inventive stabilized dispersions of inorganic nanoparticles with a urea-modified polyurethane and a modified urea as joint stabilizers. The relevant storage stability properties and sedimentation properties of the resulting inventive dispersions are set out below.

USE EXAMPLES

The dispersions prepared above were subjected subsequently to an accelerated ageing test for the purposes of the assessment of the storage stability or sedimentation tendency and also the Theological properties. The results are reproduced in table 1' below, using in each case a rating system with ratings from 1 to 5.

TABLE 1'

| | After 24 hours' storage at 50° C. | | After 5 days' storage at 50° C. | | After 14 days storage at 50° C. | |
|---|---|---|---|---|---|---|
| | Rheology | Sediment | Rheology | Sediment | Rheology | Sediment |
| Ex. 1' (comparative) | 1-2 | 4 | 2 | 4-5* | 2 | 5** |
| Ex. 2' | | | | | | |
| 0.001% by wt. stab. I | 1-2 | 2-3 | 2 | 3 | 2 | 4* |
| 0.4% by wt. stab. I | 1-2 | 1-2 | 2 | 2 | 2 | 2-3 |
| 8% by wt. stab. I | 3-4 | 1-2 | 3-4 | 2 | 3-4 | 2 |

TABLE 1'-continued

| Ex. 3' | | | | | | |
|---|---|---|---|---|---|---|
| 0.0005% by wt. stab. II | 1-2 | 2-3 | 2 | 3 | 2 | 4* |
| 0.3% by wt. stab. II | 1-2 | 1-2 | 2 | 2 | 2-3 | 2-3 |
| 5% by wt. stab. II | 4 | 1-2 | 4 | 2 | 4 | 2-3 |
| Ex. 4' | | | | | | |
| 0.5% by wt. total (stab. I + II) stab. I/stab. II = about 1:1 | 1-2 | 1 | 1-2 | 1-2 | 2 | 2 |
| 0.5% by wt. total (stab. I + II) stab. I/stab. II = about 4:1 | 1 | 1 | 1 | 1 | 1-2 | 1 |
| 0.5% by wt. total (stab. I + II) stab. I/stab. II about 10:1 | 1-2 | 1 | 1-2 | 1-2 | 2 | 2 |
| 1% by wt. total (stab. I + II) stab. I/stab. II about 4:1 | 1 | 1 | 1 | 1 | 1-2 | 1-2 |

Sediment: 1 = no sediment
5 = much sediment
Rheology: 1 = low viscosity
5 = compact
*slight synaresis
**complete sedimentation, synaresis, redispersion not possible Table 1' above shows that with the inventively employed stabilizers I and II it is possible to achieve a significant improvement in the storage stability and a significant reduction in the sedimentation tendency of the above dispersions. A particularly good effect, which goes beyond the individual effect of the respective stabilizers and is therefore evaluated as a synergistic effect, can be achieved through the joint use of both stabilizers, with an optimization of the effect being achievable through controlled selection of the relevant proportion.

The results show, furthermore, that the stabilizers used in accordance with the invention leave the rheological properties or flow capacity properties at least substantially unchanged or altered only to an extent such that use as intended continues to be possible.

Furthermore, the viscosity behaviour of a selected dispersion was monitored after different periods of storage. The results are shown in Table 2' below and indicate that the viscosity properties of the stabilized dispersions remain substantially unaltered when the inventive stabilizers are employed.

TABLE 2'

| Ex. 4' 0.5% by wt. stab. I + II total | Brookfield viscosity (23° C.) spindle 4 (ASTM D 2196) | |
|---|---|---|
| (stab. I/stab. II about 4:1) | 5 rpm | 50 rpm |
| after 24 hours' storage at 50° C. | 2090 mPas | 1001 mPas |
| after 7 days' storage at 50° C. | 2120 mPas | 1016 mPas |
| after 14 days' storage at 50° C. | 2150 mPas | 1046 mPas |

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A stabilized dispersion of inorganic nanoparticles, the dispersion comprising inorganic nanoparticles and a stabilizer in a dispersion medium, wherein the stabilizer includes a combination of (i) a modified polyurethane and (ii) a modified urea, wherein the modified polyurethane is of the general formula (I):

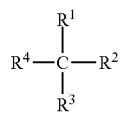

in which the radicals $R_1$, $R_2$, $R_3$ and $R_4$, are each independently a radical of the formula:

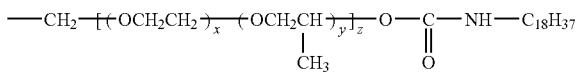

in which x is 4, y is 1, and z is 5 to 25;

and wherein the modified urea is of the general formula (II) or the general formula (II'), with general formula (II) being:

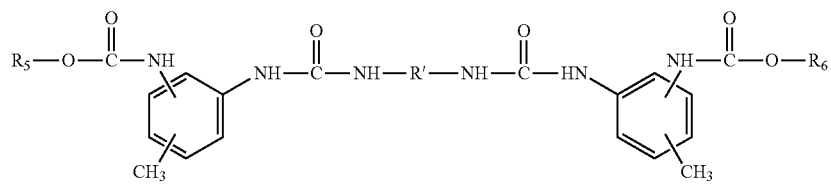

in which R' is one of the following radicals:
- $-C_pH_{2p}-$ where p=2 to 12;
- $-(C_qH_{2q}-O-C_qH_{2q})_r-$ where q=2 to 4 and r=1 to 10;

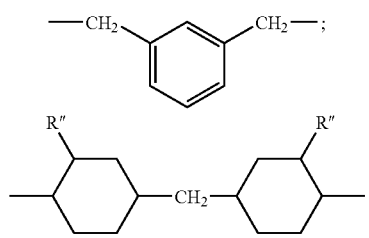

where R″ is H or $CH_3$; and

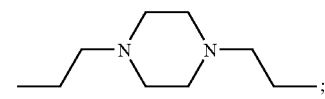

and in which $R_5$ and $R_6$ are each independently one of the following radicals:
- an n-alkyl radical or an isoalkyl radical having 4 to 22 C atoms;
- an alkenyl radical having 3 to 18 C atoms;
- a cycloalkyl radical;
- an aralkyl radical;
- a radical of the formula $C_mH_{2m+1}(O-C_nH_{2n})_x-$, where m is 1 to 22, n is 2 to 4 and x is 1 to 15;
- a radical of the formula $C_mH_{2m+1}(OOC-C_vH_{2v})_x-$, where m is 1 to 22, x is 1 to 15 and v is 4 or 5;
- a radical of the formula $Z-C_6H_4(O-C_nH_{2n})_x-$, where n is 2 to 4, x is 1 to 15 and Z is an alkyl radical having 1 to 12 C atoms;

and with general formula (II') being:

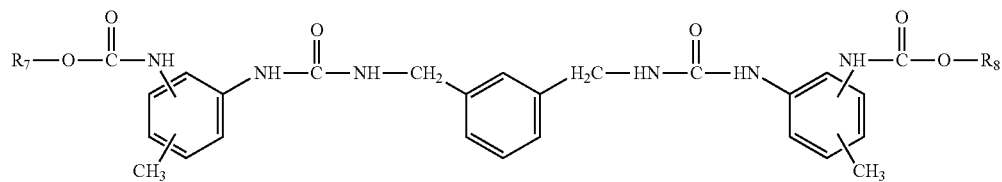

in which $R_7$ and $R_8$ are each independently one of the following radicals:

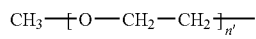

where n'=7 to 16 or

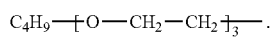

2. Dispersion according to claim 1, where (i) the modified polyurethane is added in amounts of 0.002% to 5% by weight, based on the dispersion, and where (ii) the modified urea is added in amounts of 0.001% to 2% by weight, based on the dispersion.

3. Dispersion according to claim 1, where the dispersion contains the inorganic nanoparticles in amounts of 1% to 95% by weight, based on the dispersion.

4. Coating materials and coating systems comprising a dispersion according to claim 1.

5. A coating material comprising a stabilized dispersion according to claim 4, wherein the coating material is formulated as a paint, ink, plastic, foam, cosmetic, adhesive or sealant.

* * * * *